(12) United States Patent
Powell

(10) Patent No.: US 7,058,582 B2
(45) Date of Patent: Jun. 6, 2006

(54) METHOD FOR PERFORMING PROGRAMMING BY PLAIN TEXT REQUESTS

(75) Inventor: Andrew J. Powell, Grand Rapids, MI (US)

(73) Assignee: IRN, Inc., Grand Rapids, MI (US)

( * ) Notice: Subject to any disclaimer, the term of this patent is extended or adjusted under 35 U.S.C. 154(b) by 583 days.

(21) Appl. No.: 09/955,373

(22) Filed: Sep. 18, 2001

(65) Prior Publication Data

US 2002/0103758 A1    Aug. 1, 2002

Related U.S. Application Data

(60) Provisional application No. 60/233,574, filed on Sep. 19, 2000.

(51) Int. Cl.
*G06F 3/00* (2006.01)
(52) U.S. Cl. .................. 705/1; 715/760; 715/764; 715/513; 717/106; 709/224; 709/218
(58) Field of Classification Search .............. 705/51, 705/18, 1; 717/106; 715/760, 764, 5; 709/224, 709/218
See application file for complete search history.

(56) References Cited

U.S. PATENT DOCUMENTS

| | | | |
|---|---|---|---|
| 5,835,712 A * | 11/1998 | DuFresne | 709/203 |
| 5,937,160 A * | 8/1999 | Davis et al. | 709/203 |
| 5,945,989 A * | 8/1999 | Freishtat et al. | 715/760 |
| 6,397,222 B1 * | 5/2002 | Zellweger | 707/102 |
| 6,522,738 B1 * | 2/2003 | Cruickshank et al. | 379/201.03 |
| 6,725,426 B1 * | 4/2004 | Pavlov | 715/523 |

FOREIGN PATENT DOCUMENTS

| | | |
|---|---|---|
| WO | WO 98/36365 | 8/1998 |
| WO | WO 99/66425 | 12/1999 |
| WO | WO 01/46873 A1 | 6/2001 |

OTHER PUBLICATIONS

Program listing for netcard, dated 1999, downloaded from http://www.interlogy.com.
Program listing for HTMauLer, dated 1998, and downloaded from http://www.iconinteractivegroup.com/freeware/PERK.

* cited by examiner

*Primary Examiner*—Elisa Pierre
*Assistant Examiner*—Daniel L. Greene
(74) *Attorney, Agent, or Firm*—Warner Norcross & Judd LLP

(57) ABSTRACT

A method of making programming changes using plain text requests. A requestor can request a programming change in plain text and the software program converts the plain text to programming code. The method includes steps of: (1) receiving a plain text request for a programming change; (2) verifying that the requestor is authorized to request the change; (3) interpreting the request; and (4) making the requested change. The software may send a confirmation to the requester before and/or after the programming change. If the confirmation is sent before the change, the software waits for a reply from the user instructing it to proceed with the change.

16 Claims, 18 Drawing Sheets

OBJECT REPORT • INDEX.HTM • ALL OBJECTS (LEVEL II)

title=Welcome to Piquet Technologies!

css1= footer.css
css2 =it_link.css
css3=header.css linkcolor=#275275
vlinkcolor2=#277174
alinkcolor3=#808080
bkgcolor=#FFFFFF
textcolor=#000000 table1_border=0
table1_cellpadding=0
table1_cellspacing=0
table1_width=700 table1_row1_height=75
table1_row1_cell1_width=210
table1_row1_cell1_height=75
header_logo=

Company
NAME (piquet_tech.jpg)

table1_row2_height=25
table1_row2_cell1_width=100
table1_row2_cell1_font=Arial
table1_row2_cell1_fontsize=1
table1_row2_stylesheet=header.css
table1_row2_cell1_bkg=

(bkg1.jpg)

menu1=HOME

Fig. 10

METHOD FOR PERFORMING PROGRAMMING BY PLAIN TEXT REQUESTS

PRIORITY CLAIM

This application claims priority from Provisional Application No. 60/233,574 filed Sep. 19, 2000, entitled "Intellijinx Technology".

BACKGROUND OF THE INVENTION

1. Field of Invention

The present invention relates to a method of performing programming code changes with plain text requests.

2. Description of the Art

Companies and individuals increasingly use computers to perform a variety of tasks. Conventionally, companies purchase software to perform specific tasks such as tracking financial transactions, word processing, or creation, design and revision of web sites. Specialized knowledge and programming skills are usually required to operate and customize these programs. As computers and software grow increasingly complex, the necessary programming knowledge to operate and customize these programs grows proportionally. The cost of these programs and the cost of the personnel to implement and operate them has also grown proportionally.

Today a growing number of businesses and individuals have web sites. As information and data rapidly changes, web sites need to be constantly updated to reflect these changes. Each year businesses and individuals spend significant money to keep their web sites accurate, up-to-date, easy to use and aesthetically pleasing. Web sites use Hyper Text Markup Language, generally known as HTML, which requires specialized knowledge to program and revise.

Almost all computer programming, including web site development and updates, is performed within Integrated Development Environments (IDEs). These IDEs simplify the programming process but are still very complex to use. The user of an IDE must understand the programming language being created or revised. Most IDEs include a full pallet of software tools (even though a user rarely uses most of these tools) making the IDEs cost prohibitive and complex. Because of their complexity, significant training time is usually required. A problem with IDEs is that even if a user is familiar with the IDE, mistakes and unintentional changes can be made, yet hard to correct. The above factors cause almost any programming changes to be performed by specialized personnel.

Each year companies spend large amounts of money on information technology departments or outside consultants. In many cases, the person or department in charge of operating or revising programs or web sites rarely possesses the information that needs to be incorporated into the programming code. For example, the required information may be within another department or a multitude of departments making it difficult to communicate necessary changes. It may also be difficult to explain the information to those updating the web site. These problems cause many companies to never update their web pages until the web site needs to be completely revised.

SUMMARY OF THE INVENTION

The aforementioned problems are overcome in the present invention, wherein a method allows users to easily perform programming changes. More specifically, a preferred method of performing programming changes through software includes the following steps (1) receiving a plain text request for a programming change, (2) verifying that the requestor is authorized to request the change, (3) interpreting the request, and (4) making the requested change.

In the first step, the request is sent to a system running software that automates the change. The request is generally made in plain text by sending an e-mail or filling out a web-based form. Plain text requests and familiar methods, such as e-mail, eliminate the need for specialized knowledge. There are no complex software programs to learn.

In the second step, the software implementing the current method verifies the request to prevent unauthorized changes. In an e-mail-based system, the verifying is done by verification of the e-mail address, verification of the IP address, a confirming e-mail, and/or a user identification with a password. Similar methods of verification may also be used in a form-based system.

In the third step, the software interprets the request. The software determines what the user is requesting, such as a change request or a report request, and then parses the text of the request to determine a list of variables. The list of variables is used to divide the request into specific tasks, commands and necessary information.

In the fourth step, the software performs the requested programming change. More specifically, the software creates new programming code from the list of variables. In some applications, such as web sites, the created programming code may be the exact text words in the request that are to be replaced on the web site. The created programming language may also be simply a file location. Preferably, the changes are made to a BETA site or program before any changes are made to the actual web site or program.

In a fifth optional step, the software sends a confirmation to the original requestor or administrator. Preferably, this confirmation will include a link which the requester may click to accept the changes. The confirmation link may also change the actual web site or program to match the BETA version.

The software is particularly well suited to perform programming changes for web sites. A user may easily create new web pages by using form pages to which text, images and animations are added. The software also prevents accidental design changes and keeps the overall layout of the web site consistent. All these advantages provide an inexpensive yet efficient way to perform programming code changes. Another benefit is that the software removes the workload from the information technology department and allows the personnel with the necessary information to directly change the program.

These and other objects, advantages, and features of the invention will be more fully understood and appreciated by reference to the detailed description of the preferred embodiment and the drawings.

BRIEF DESCRIPTION OF THE DRAWINGS

FIG. 10 is a detailed object request.

DETAILED DESCRIPTION OF THE PREFERRED EMBODIMENT

The present invention is a method that efficiently performs programming code changes through software. The method is implemented generally by software that resides on a computer, a server, or some other device with access to the programming language to be changed. Here "change" refers to all types of programming changes, which may include adding programming code, modifying programming code, or deleting portions of the code.

The present invention may be implemented to interpret plain text requests and change any programming language, including but not limited to HTML, Visual Basic C, C++, Java, Java Script, Visual Basic Script, and Pascal. For ease of explanation, the present invention will be described in detail as performing a programming change request in HTML, although it should be readily apparent that the present invention may easily be transferred to other programming languages.

The present invention is well suited for web site changes. With web pages, a requester may easily determine the location of a change, such as what pages, tags or objects need to be changed through report requests. The graphical format of a web page report request allows a requester to easily understand and locate where the change needs to be made and the name of the object associated with the change without having specialized knowledge. The user may easily replace images, animations, graphics, colors, blocks of text or data sheets by specifying new file locations.

I. Method

The preferred method of updating a web site using the present invention generally includes (1) the software receiving a request, (2) verification of the request, (3) interpreting the request, (4) changing the programming code, (5) sending a confirmation e-mail, and (6) updating a log file.

Figure 3:
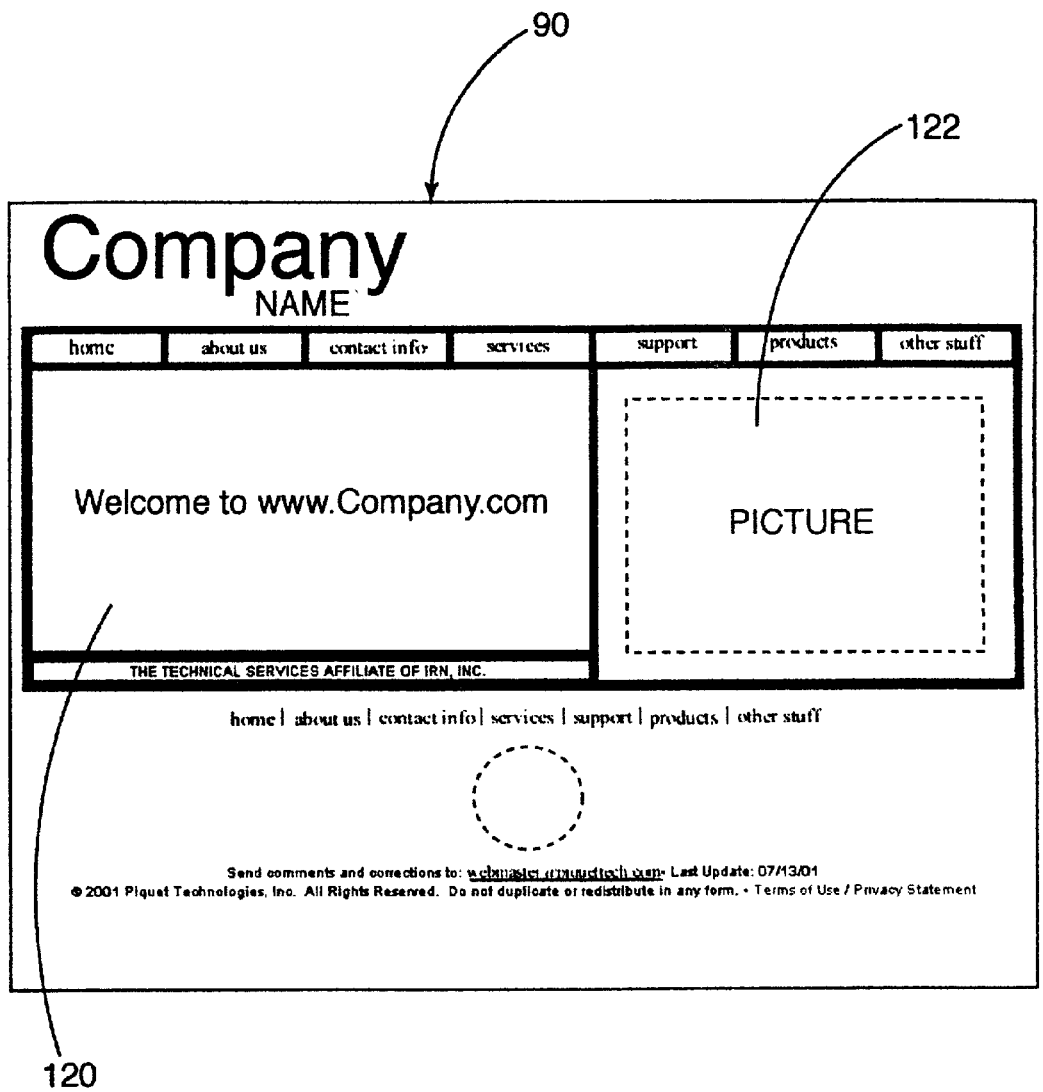
FIG. 3 is a sample web page.

Internet browsers receive source code, usually HTML code, to produce and display web pages. A sample web page 90 that will be changed as an example may be seen in FIG. 3. To demonstrate the preferred embodiment of the invention, the text "welcome to Intellijinx.com" 120 and the image of the circuit board 122 will be changed. The HTML code associated with these changes may be seen in Table 1 entitled Unchanged Code.

TABLE 1

Unchanged Code

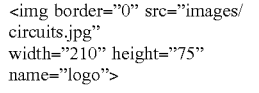

Figure 1:
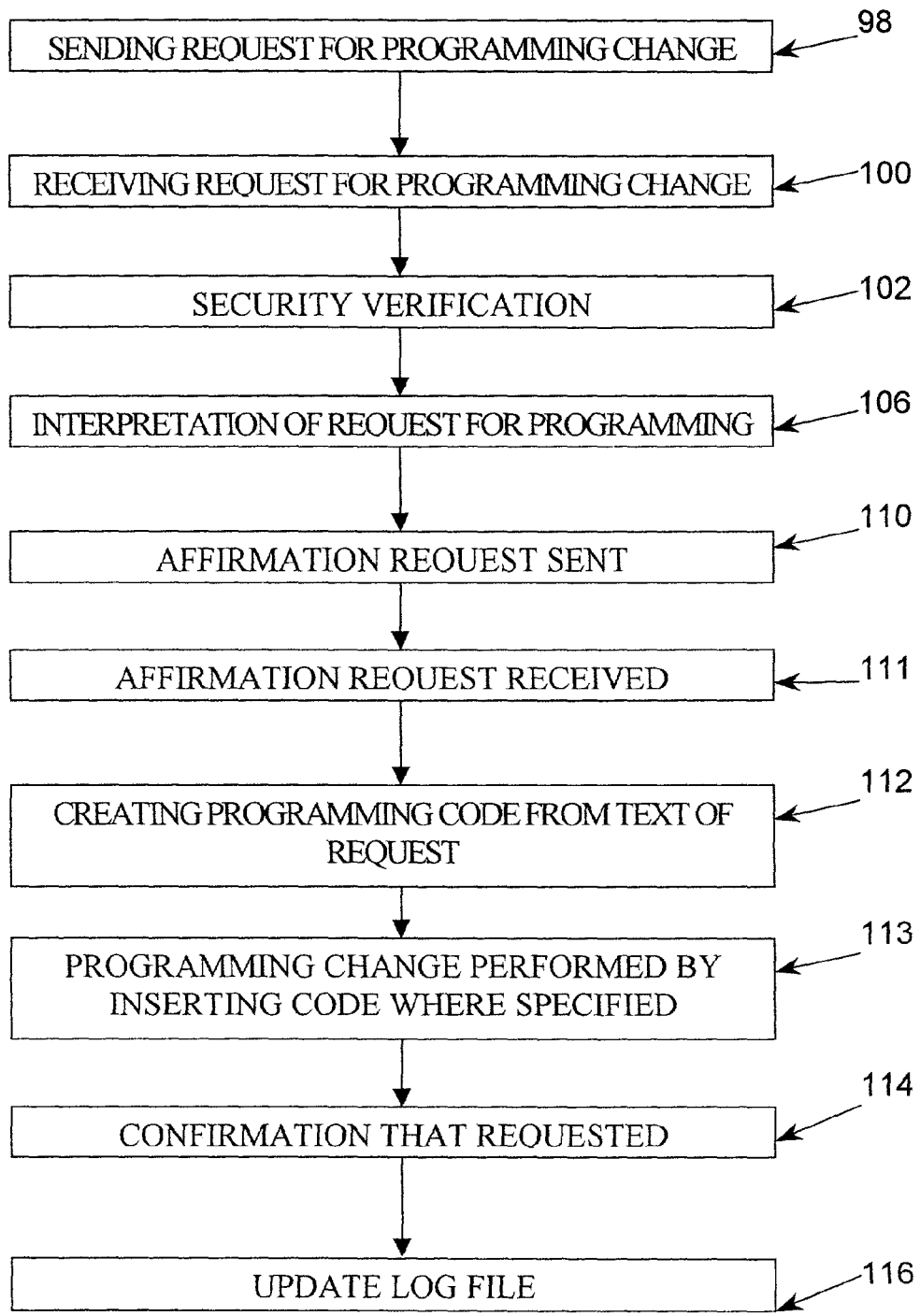
FIG. 1 is a flow diagram of the preferred method.
Figure 2:
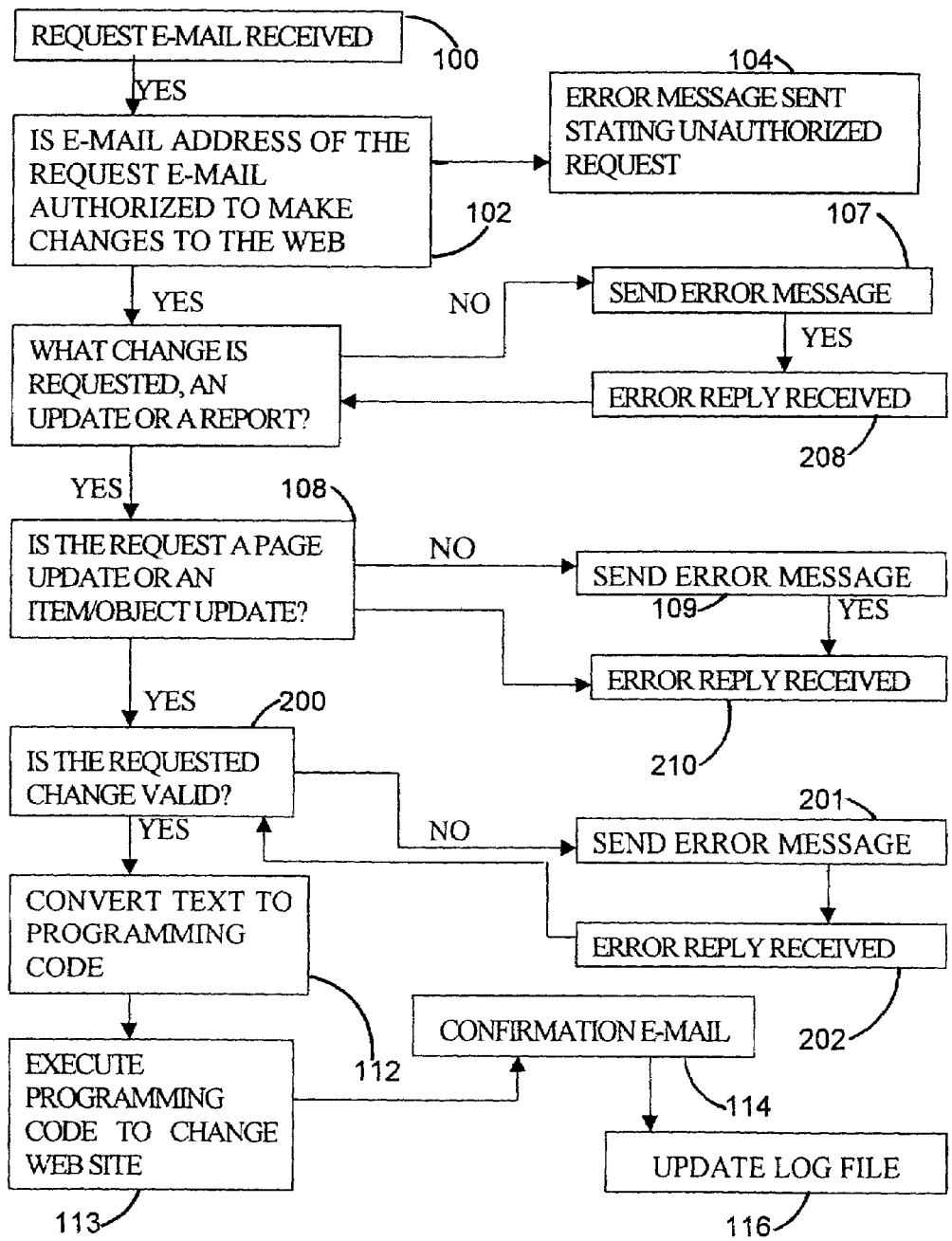
FIG. 2 is a process schematic of updating web sites.
Figure 4:
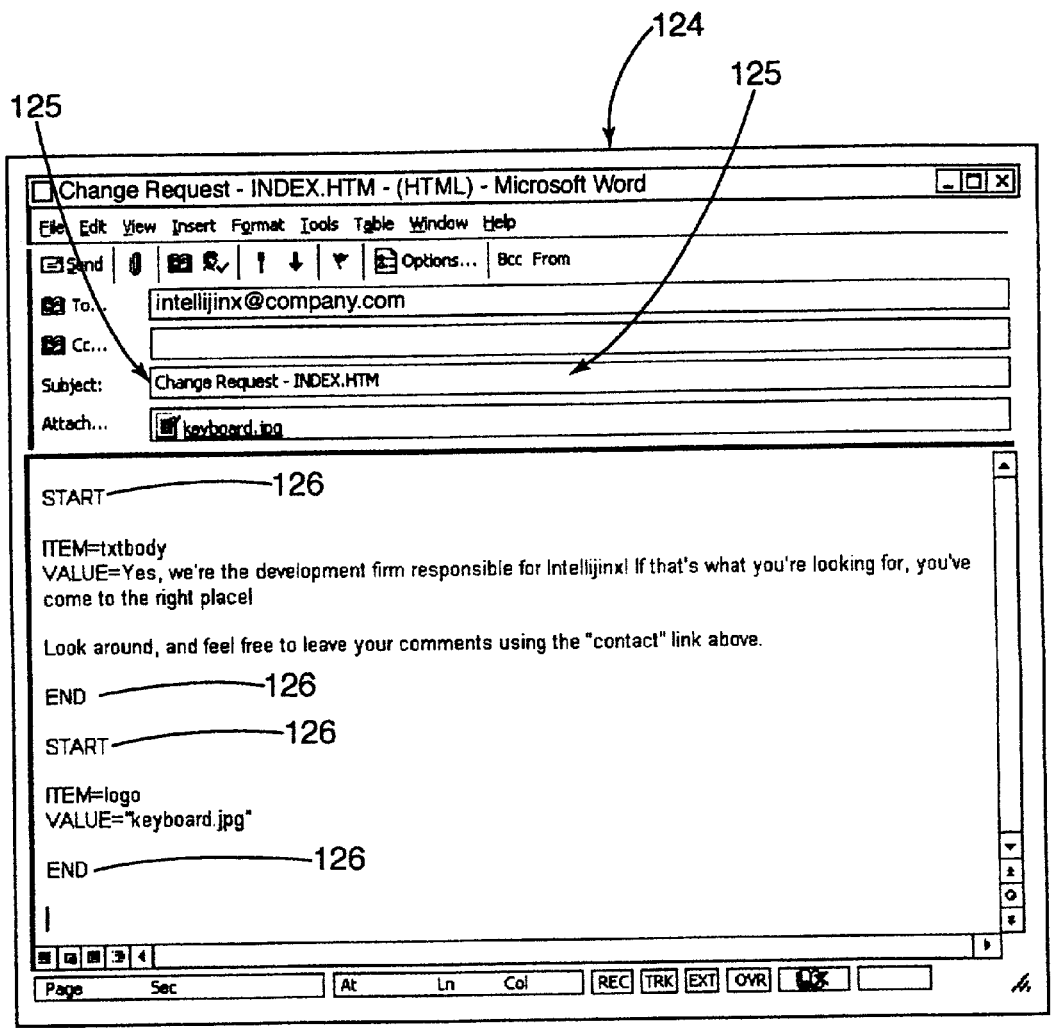
FIG. 4 is a sample e-mail request with database identifiers.
Figure 5:
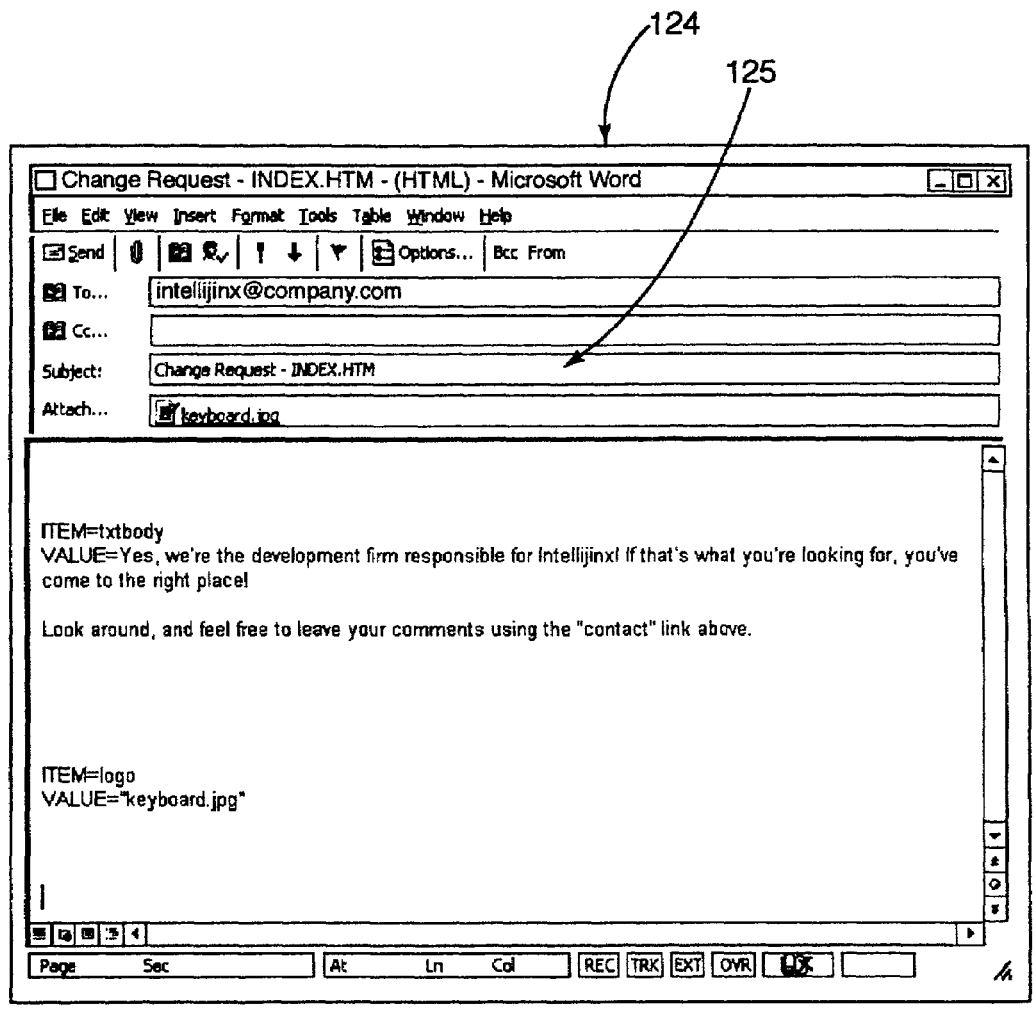
FIG. 5 is a sample e-mail request without database identifiers.

As illustrated in FIGS. 1 and 2, the first step 98 is to send a request to the server for a programming change. In the preferred embodiment, the request is made by an e-mail 124 as shown in FIG. 4 or a form 130 as shown in FIG. 5. The request e-mail 124 is sent to the software and may include a variety of requests such as (1) deleting a web page from the web site, (2) adding a web page to the web site, (3) changing the existing page on the web site, or (4) changing multiple pages. In the preferred embodiment, the subject line 125 of the request e-mail 124 includes the type of request and the location of the request. As shown in FIG. 4, the subject line 125 specifies a programming change to the index.htm web page. The complete address of the web page to be changed may also be used, such as www.intellijinx.com/index.htm. It should be readily apparent that the type of request and the specific location of the change is not limited to the subject line of the e-mail, but may be specified in the text body or by some other means. Further, the words associated with the type of request, such as "change" used in the subject line 125 of the sample e-mail request 124 are set by the user when the software is implemented. For example, "change" could instead be, "update" or "modify".

In the preferred embodiment, as shown in FIG. 4, the request e-mail 124 includes database commands 126. These database commands 126 are shown as "START" and "END" but could be other words such as "BEGIN" and "STOP". As shown in FIG. 5, database commands may be hidden to the user. In other embodiments, database commands such as "START" and "END" may not be needed. For example, the word "ITEM" 127 in the request may act as the start of a new request and end of the last request. Of course, non-database systems may also be used.

The user may request through the request e-mail 124 the changing of objects, images, text or any other necessary change. Object files like images and audio files may be attached to the request e-mail 124. The request e-mail 124 may also specify the copying of a file from a network drive, from another web page, or any other place accessible by the software. In the preferred embodiment, the request e-mail 124 follows a standard format to reduce errors. If a standard format is used, it may be published in an easily accessible place such as a company's intranet.

Figure 6:
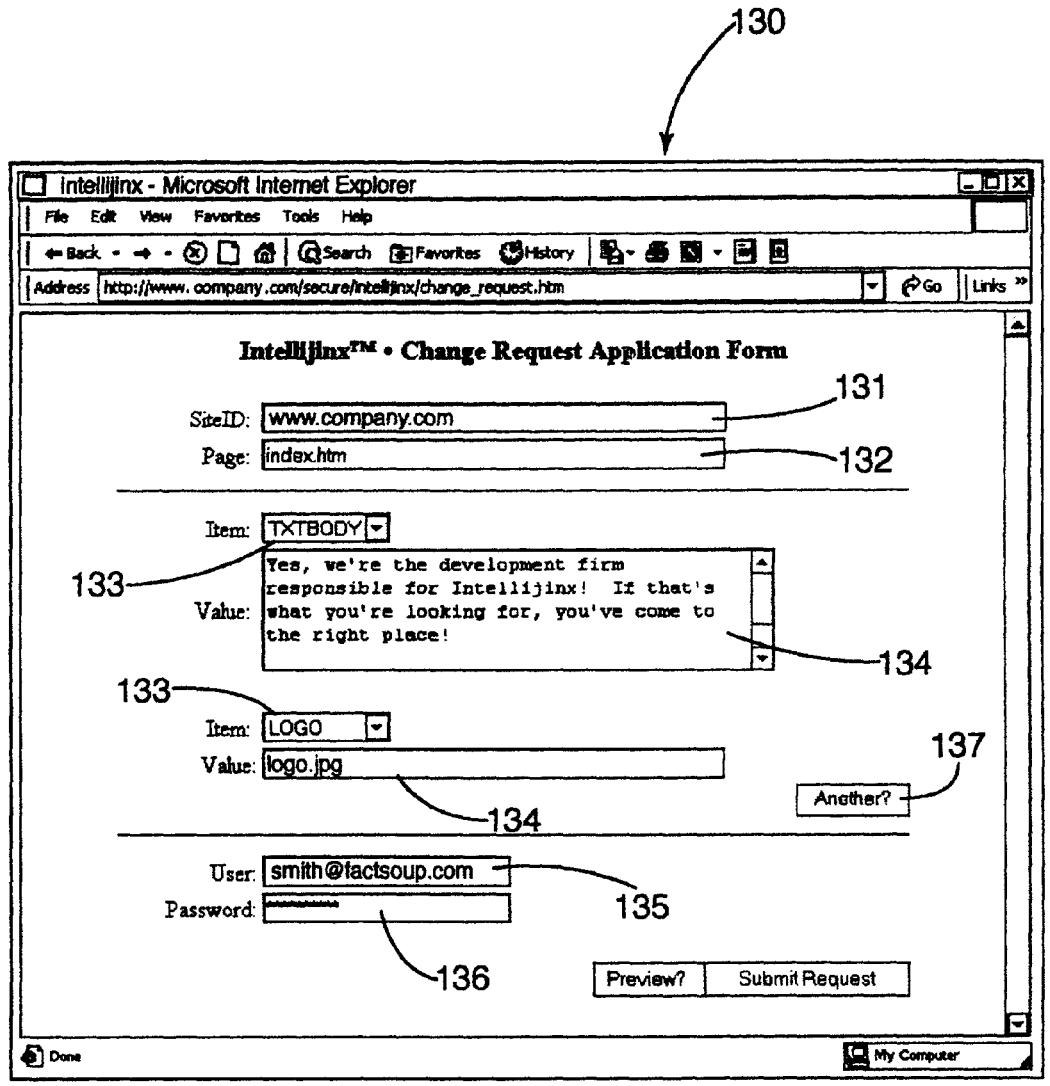
FIG. 6 is a sample form request.
Figure 7:
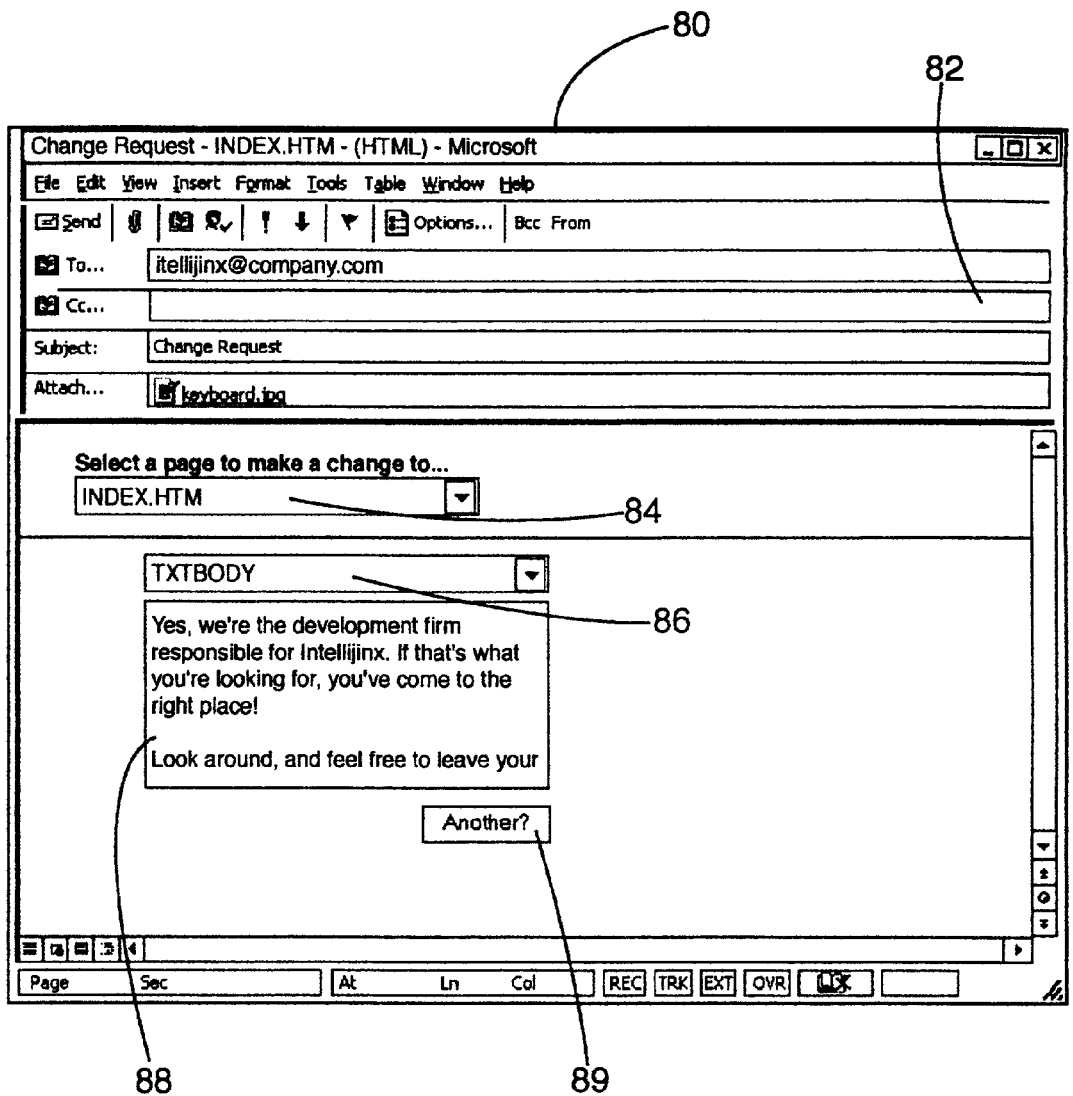
FIG. 7 is a form request within an e-mail.

A form 130, as shown in FIG. 6, may also be used. The form 130, as shown in FIG. 6, is only a change request form, but it should be readily apparent that the form 130 may be modified to accommodate any other type of request. It should be understood that a generic form for all types of requests may be used. The generic form (not shown) may include a text box or drop down list box, which specifies the type of request that may be desired. In the preferred embodiment, the request form 130, as shown in FIG. 6, includes (1) the site ID box 131 in which the requester specifies the web site, (2) a page address 132 to specify a specific page, multiple pages, or the whole web site, (3) a request item box 133 with a replacement value 134, (4) a user ID 135, and (5) a password 136. Multiple requests may be made through the form 130 by the "Another?" button 137. Of course, a simple request form (not shown) where the user submits one request per form may be used. An e-mail form 80 as shown in FIG. 7 may also be used. The e-mail form 80 includes a subject line 82 detailing the type of request, a location drop down list box 84 specifying the location of the request, an item drop down list box 86 specifying the item to be changed, and a value box 88 to specify in detail the change. The e-mail form 80 may also include an "Another?" button 89 like the form 130 above. The request may also be done in a software program on the requestor's terminal that performs the step of sending a request 100 to the software.

Figure 8:
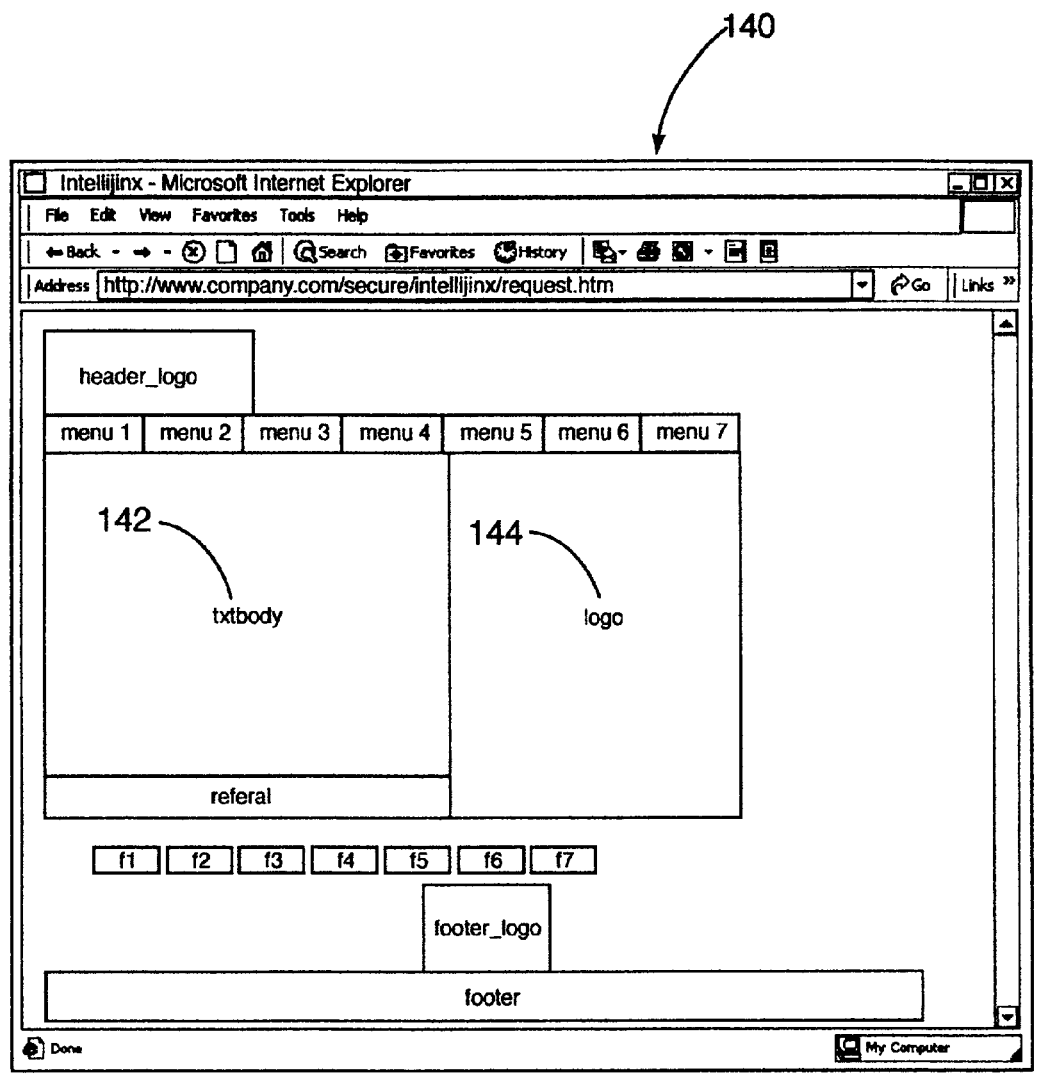
FIG. 8 is a simplified web page report.

In some cases, the requester may need to view the web page or the underlying code to determine the location of the items, text or objects to be changed. To view the location, the requester will usually send a report request. Before software responds to a report request, it will first verify the authenticity of the user as discussed below. In the preferred embodiment, to provide a report request or show the location of objects and text, the report may be sent by an e-mail (not shown), or the software may allow the user to view a simplified source code web page 140, as shown in FIG. 8. When web pages are initially set up, they are preferably laid out in a table format simplifying change and report requests. The table format may be seen in FIGS. 3 and 8. The text 120 in FIG. 3 of "Welcome to Intellijinx.com" corresponds to the box labeled "txtbody" 142 in FIG. 8. The picture of the circuit board 122 in FIG. 3 may easily be seen to correspond to "logo" 144 in FIG. 8.

Figure 9:
FIG. 9 is a detailed report.

In some cases, a more detailed report request may be desired, for example, by an administrator of the web site. An example of a more detailed report request 150 may be seen in FIG. 9. The detailed report request 150 may include the complete HTML code (not shown) or the HTML code associated with each object when the web site was set up. As shown in FIG. 9, the web page may be divided into a table of code 152 and a table of objects 153. The objects 154 correspond to snippets of the HTML code. The text "Welcome to intellijinx.com" 90 may be seen to correspond to the txtbody object 92. The file name of the circuit board logo 94 may be seen to correspond to the logo object 96. The objects 154 in the detailed report request 150 allow an administrator to change a variety of things such as color, size of the tables, graphics, text, type of font and/or font size. To prevent confusion, the detailed report request may use the format shown in FIG. 10. The detailed report request may also be laid out in the table format shown in FIG. 6 with many of the details from the detailed report request added to each box. The table layout of FIG. 6 may be easier for some users to understand and prevent confusion. Limiting the changes, such as design changes, to an administrator keeps the web site consistent with the original design and maintains the uniformity of the web site.

Upon receiving a request, the software performs the step of security verification 102. First, the software matches user variables, generally the e-mail address of the request, including the IP address, to a database containing a list of users and rights. For networks with multiple IP addresses, the site may match an e-mail address to a range of IP addresses. To perform the step of security verification in form-based systems, the software usually will compare a user ID 135 and password 136 to a database of user variables (not shown). In the preferred embodiment, to perform the step of security verification 102, the software compares the user variables to a structured query language database that includes various levels of access assigned to each user. The levels of access and what they include will vary between companies. A sample list of the rights a company may grant is the ability to (1) create web pages within a given domain, (2) modify the details of a given web page or domain, (3) modify the HTML code of a given page or pages within a domain, (4) remove a page, an item or a file from a given domain, (5) post all changes from the BETA web site to the actual web site, (6) receive a notification when a page has been posted to the development site, and (8) receive a notification when a page has been posted to the actual web site. Of course a user may be granted a limited set of these rights or be granted additional rights.

To increase security and prevent unauthorized changes, the software may be configured to send a confirmation e-mail (not shown) asking for confirmation of the request. If an unauthorized request breaches the security through falsifying user variables, such as the e-mail address and the IP address, the confirmation e-mail will be sent to the proper person. This prevents any unauthorized changes because the person who receives the confirmation e-mail for something they did not request will not confirm the request. Another option is for the software to send the confirmation e-mail to an administrator or supervisor or both the administrator and the requestor. This reduces unnecessary requests, ensures the accuracy of the site, and prevents unauthorized changes.

Figure 11:
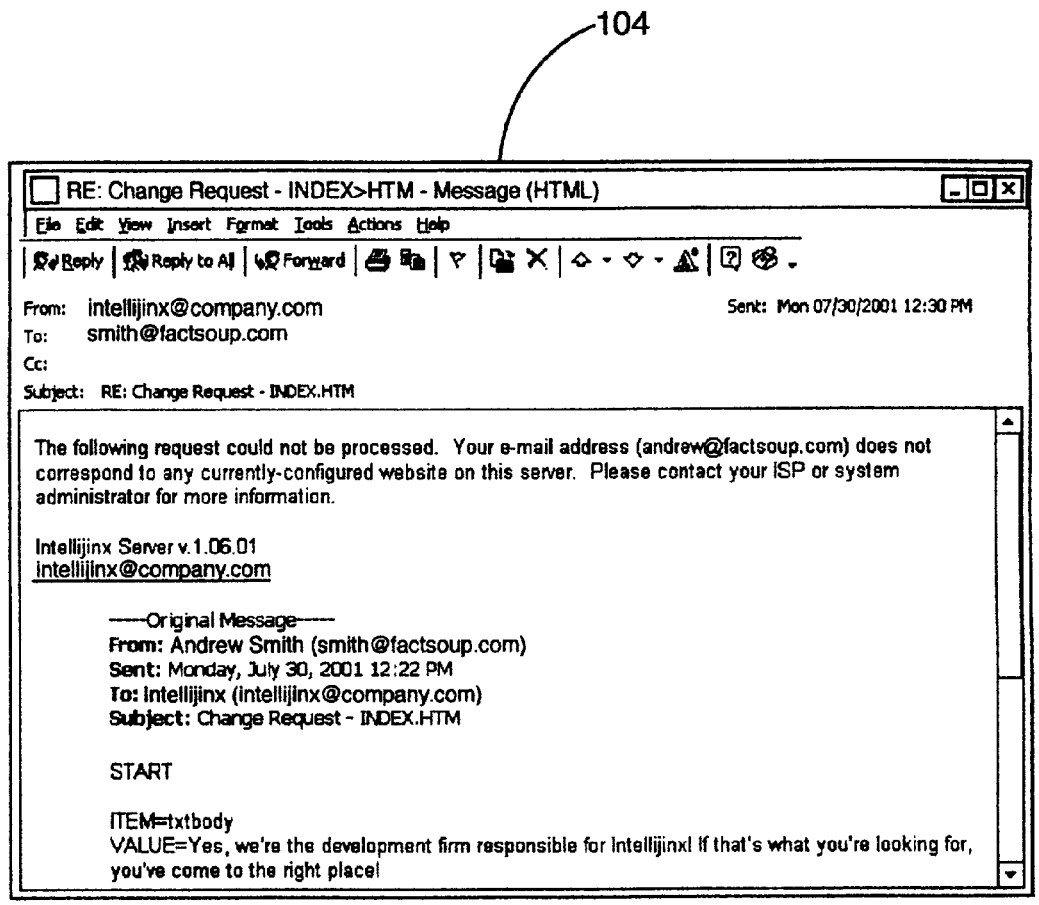
FIG. 11 is a security error notification.

In lower security embodiments, the software may send a security error notification 104 as shown in FIG. 11. This would help authorized users who make a mistake correct the mistake. In the preferred embodiment, the security error notification 104 is in the form of an e-mail and includes reasons why the request could not be verified. In some embodiments, the user may be allowed to respond directly to the security error notification 104, instead of submitting a new request. In other cases, the requestor may have to resubmit a valid request such as from a valid e-mail address and IP address. The software may also allow a user to respond to the security error notification 104 by entering a user ID and password and override the request. The above security verifications are just samples of potential methods to ensure secure changes and prevent unauthorized access.

Once the authenticity of a request is determined, the software must interpret the request to determine what change is desired. In the preferred embodiment, the software parses the request to form a table of data as shown in Table 2 entitled User Variables. Table 2 also shows how each user variable was determined. It should be readily apparent that the method of parsing the text, the location of the variables, and what variables must be determined will vary from application to application. In the preferred embodiment, the software parses the test of the request 100 using the database identifiers as shown in FIG. 4 to determine each variable as seen in Table 2.

TABLE 2

User Variables

| Variable: | Set to: | How was this determined? |
|---|---|---|
| DOMAIN | piquettech.com | It's the domain of the e-mail's destination. |
| USER | smith@piquettech.com | It's the full e-mail address of the sender. |
| USER_IP | 10.0.0.94 | It's in the header of the e-mail. |
| TYPE_OF_CHANGE | change | It's in the subject line. |
| PAGE_OF_CHANGE | index.htm | It's in the subject line. |
| CHANGE_COUNT | 2 | It's the number of START / END pairs in the text. |
| ITEM(1) | txtbody | It's the name of the first item specified. |
| ITEM(2) | logo | It's the name of the second item specified. |
| VALUE(1) | Yes, we're the developm . . . | It's the value specified for item #1. |
| VALUE(2) | keyboard.jpg | It's the value specified for item #2. |

Figure 12:
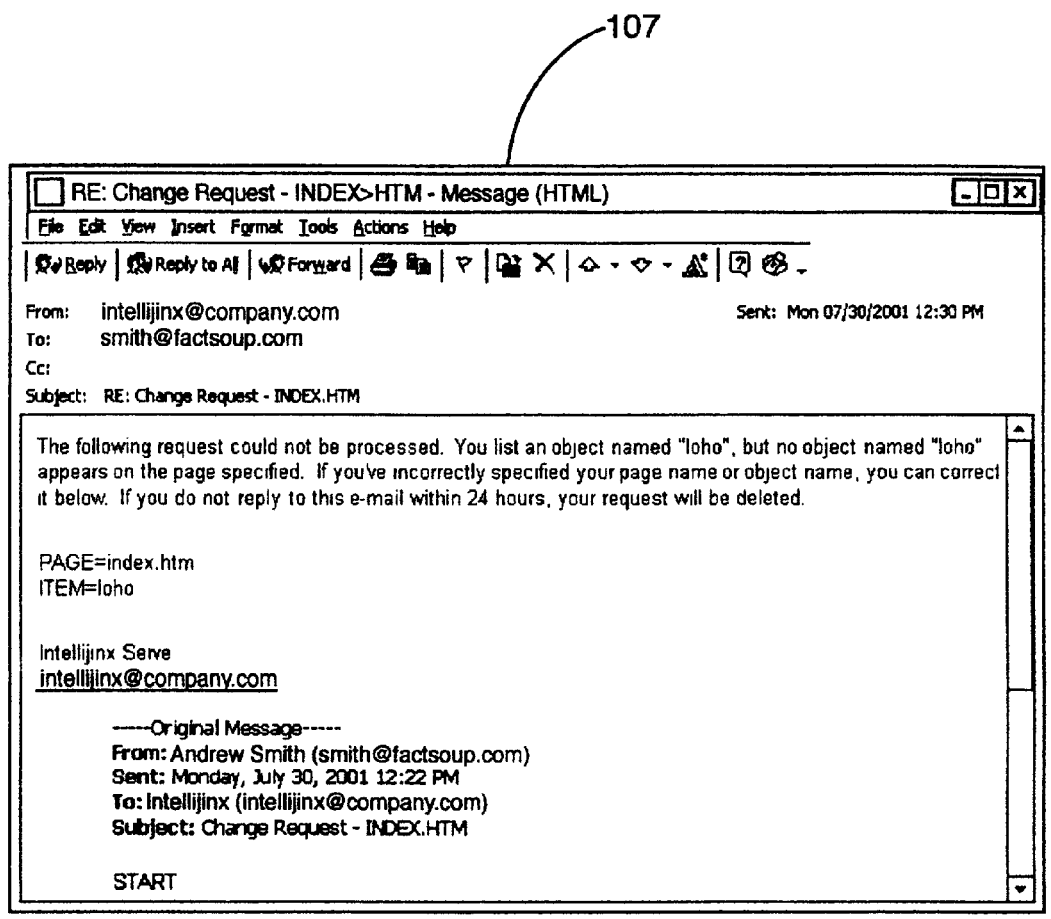
FIG. 12 is an interpretation error notification.
Figure 13:
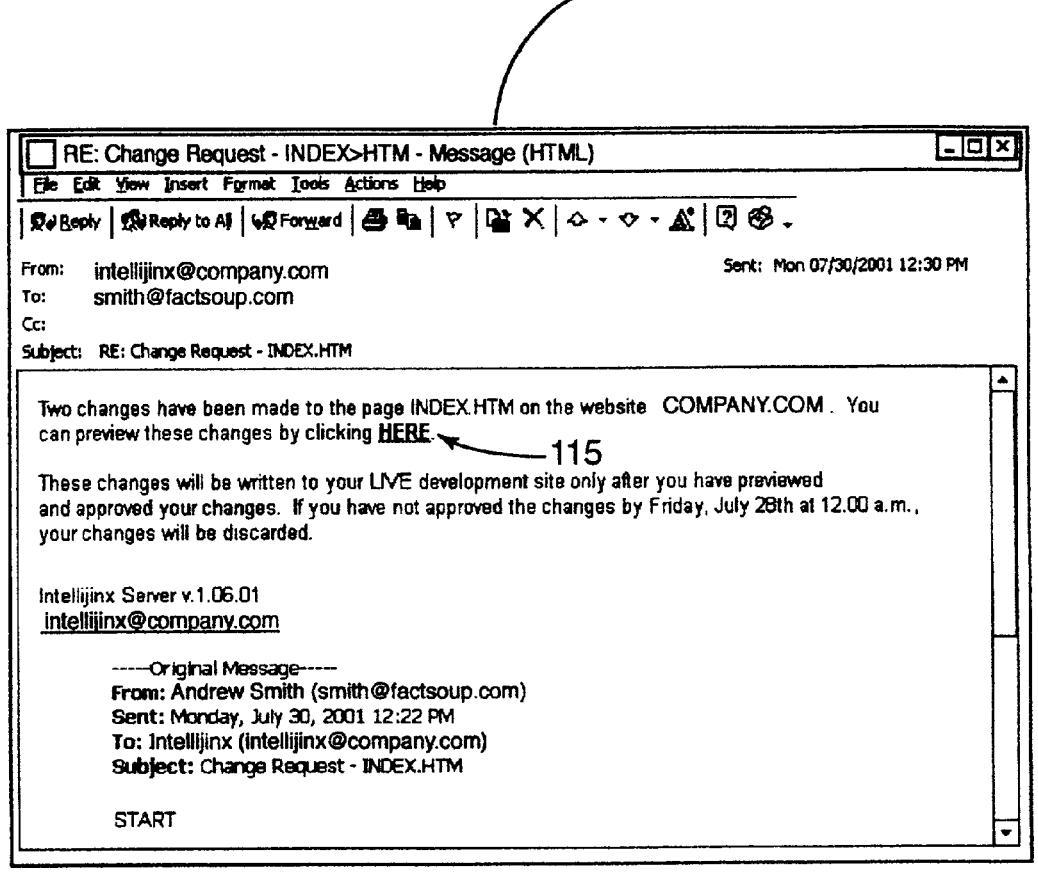
FIG. 13 is a view of a change notification.

If the software cannot determine one of the variables, it will send a clarification request 107. This clarification request 107 can include as much detail as desired. In the preferred embodiment, the clarification request 107 is in the form of an e-mail. The clarification request 107 can even include notification of multiple errors by listing each error. The clarification request 107 in FIG. 12 shows the software responding to the misspelling of the word "logo" as "loho". As previously shown in the simplified report request (FIG. 6) and the detailed report request (FIG. 8), the word "logo" was the object name for the image of the circuit board. In the preferred embodiment, an error for one of many requests 100 will not affect any of the other requests. The software can split the errors in the valid request thereby performing any valid request while sending a clarification request 107 for any errors. Of course, the software can be set so that any errors must be corrected before any changes are performed. The administrator of the system may also set a time limit for the requester to respond to the clarification request 107. If the requestor replies to the clarification request 107, but the reply is still invalid, the clarification request 107 may be resent. In some instances, the resent clarification request 107 may include the thread of conversation of past requests 100 and replies 107. Each clarification reply 107 may be tailored to the current error or to the complete history of errors. The clarification reply 107 may also suggest correct requests, like a spell check system. In the sample clarification reply 107 shown in FIG. 11, the software could easily suggest "logo" as the correct item request after searching the web page for similar objects. Another option is for the log file 191, discussed below, to maintain a complete thread of the conversation to help users who are having problems with software. An administrator, by looking at the log file, may help correct the problem.

Next, the software determines what is requested and if the request can be performed. More specifically, the software looks beyond the objects shown in FIGS. 6 and 9 to the code associated with each of the objects. The software identifies the HTML code associated with each of the specified objects. The identification process may be done through a variety of methods. In the preferred embodiment, the objects are matched to the HTML code using a database. A database system usually parses the code for tags which are associated with the requested objects. The software may identify an object as a single tag or a standard tag pair in HTML. As shown in FIG. 9, the <font> tag may be clearly defined. A database method is well suited for web sites that include large amounts of data that frequently need to be changed. Another preferred method is to clearly name the objects in the code. These named objects are then the same objects defined in the report request as shown in FIGS. 8–10 but incorporated into the code. Yet another method is to create unique object names and IDs for every tag on every page. This will almost invariably need to be done during the initial design and publishing of the web site. An example of this method may be seen in FIG. 9 with the table of code 152 on the left and the database of objects 153 on the right. If the unique objects are set when the programming language is created, a request may specify any changes with great detail. In some cases, the user may be able to specify every detail of the web page and make changes to any aspect of the code. It should be readily apparent that a web site may be created that uses a combination of the above methods for identifying the code associated with the specified objects.

Once the code associated with the objects has been defined, the change may be made. In HTML, this may be as simple as inserting text or a file specified by the requester. Web pages are generally very data and graphic oriented. Therefore, most text may be replaced by the user specifying the new text, and most images replaced by specifying the file location of the new image. To perform the change as requested in FIGS. 4 or 5, the programming code before and after is shown in Table 3 entitled Code Changes. As seen in the Table 3, the specific text and the file name has been replaced.

TABLE 3

Code Changes

| | Text change | Image change |
|---|---|---|
| Previous | <font face="Arial" color="#EDF5C9" size="2" name="txtbody">Welcome to www.intellijinx.com!<br></font> | <img border="0" src="images/circuits.jpg" width="210" height="75" name="logo"> |
| Changed | <font face="Arial" color="#EDF5C9" size="2" name="txtbody">Yes, we're the development firm responsible for Intellijinx! If that's what you're looking for, you've come to the right place!<br><br>Look around, and feel free to leave your comments using the "comments" link above. </font> | <img border="0" src="images/keyboard.jpg" width="210" height="75" name="logo"> |

Figure 15:
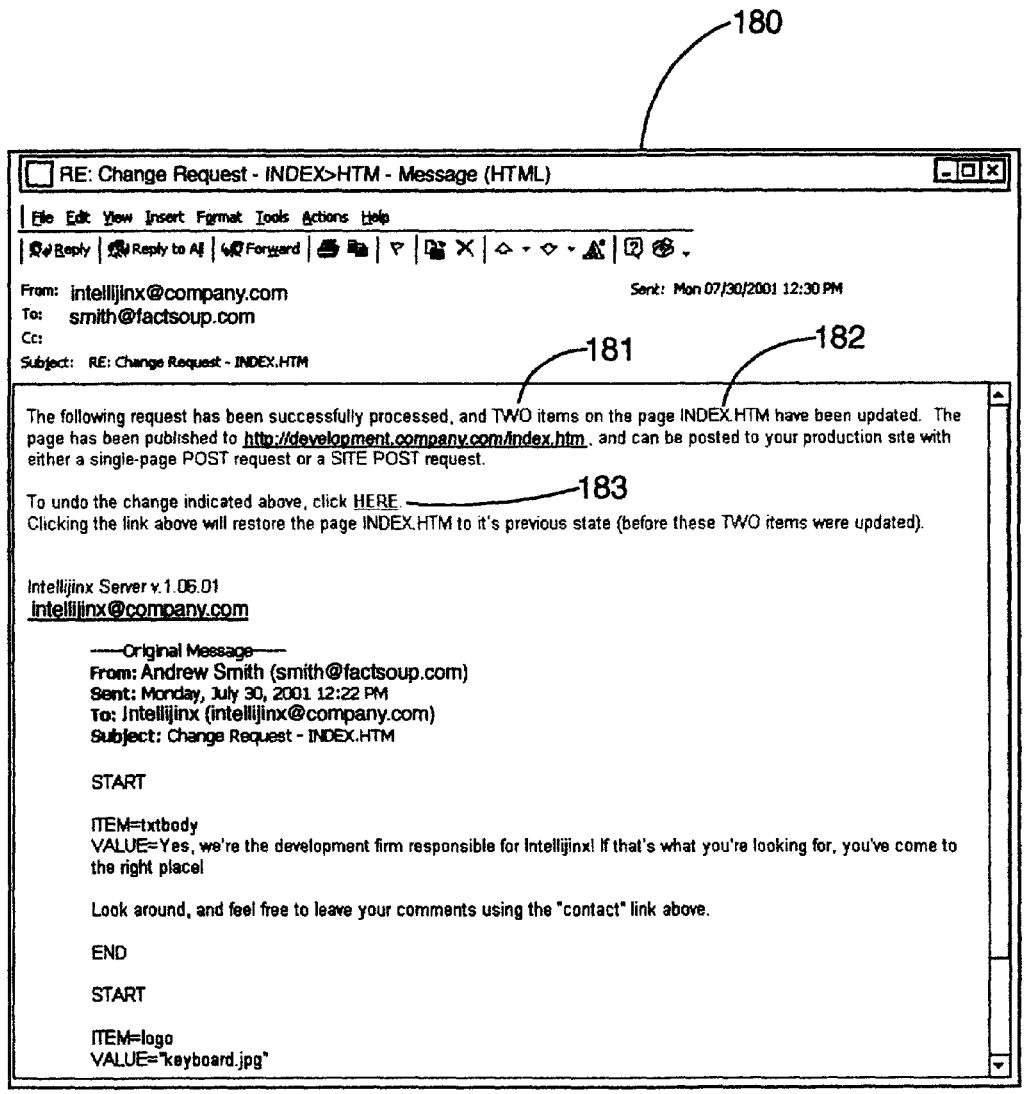
FIG. 15 is a confirmation e-mail.

Upon performing the change, the software sends a confirmation reply 114 as shown in FIG. 15. The confirmation reply 114 may be an e-mail, a form or some other type of notification. In the preferred embodiment, the confirmation reply 114 is an e-mail that includes a link 115 to preview the change. The link 115 opens a changed BETA web page. Of course, in some cases, a copy of the changed page may be sent directly to the requestor. The confirmation reply 141 may also include the number of changes, location of the changes and type of changes. The type and amount of information included in the confirmation reply 114 will vary as needed. The amount of information in the confirmation reply 114 can vary by the access level of the requester. Of course, the confirmation reply 114 may be sent instead to an administrator or both the administrator and the requester.

Figure 14:
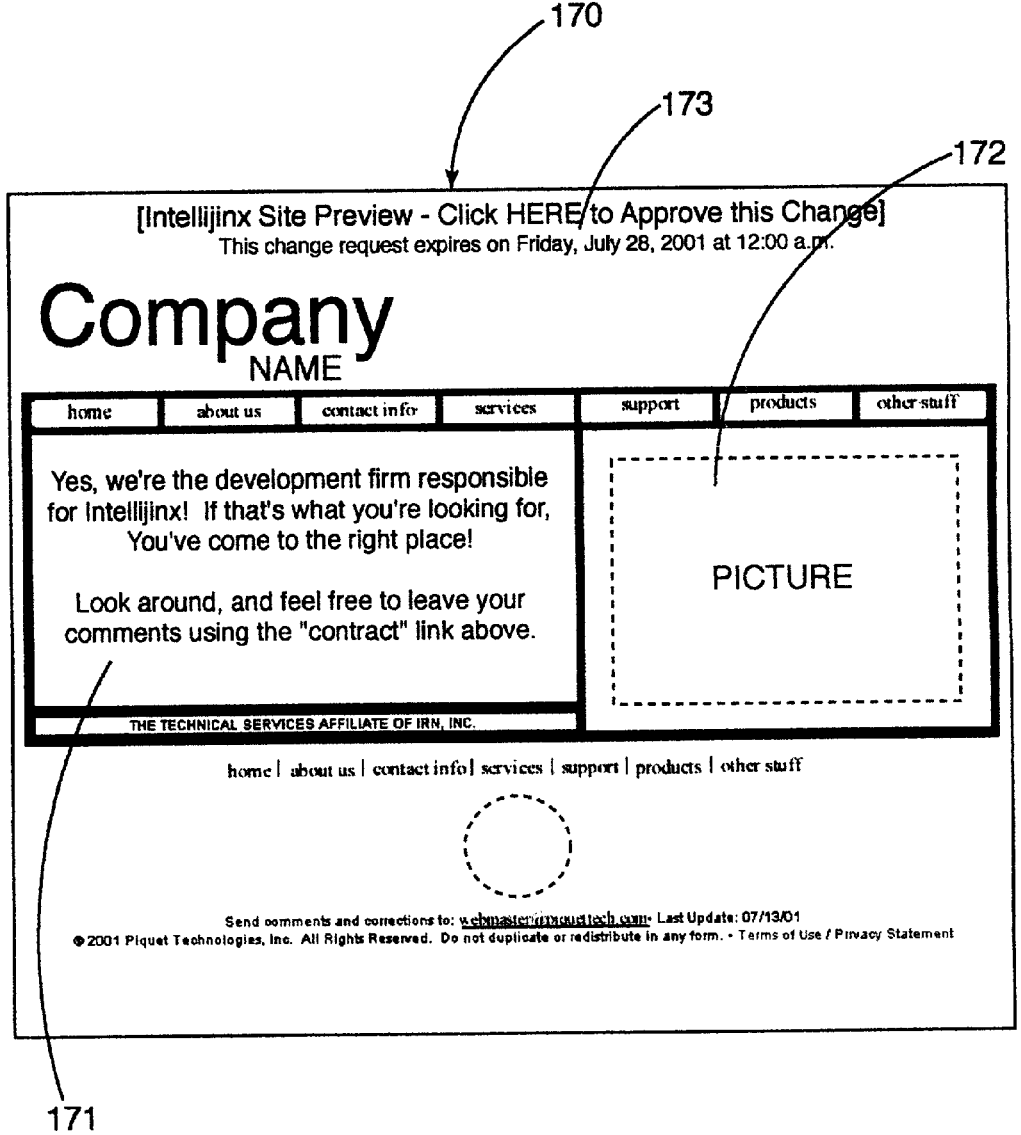
FIG. 14 is a sample web page showing changes with confirmation link.
Figure 16:
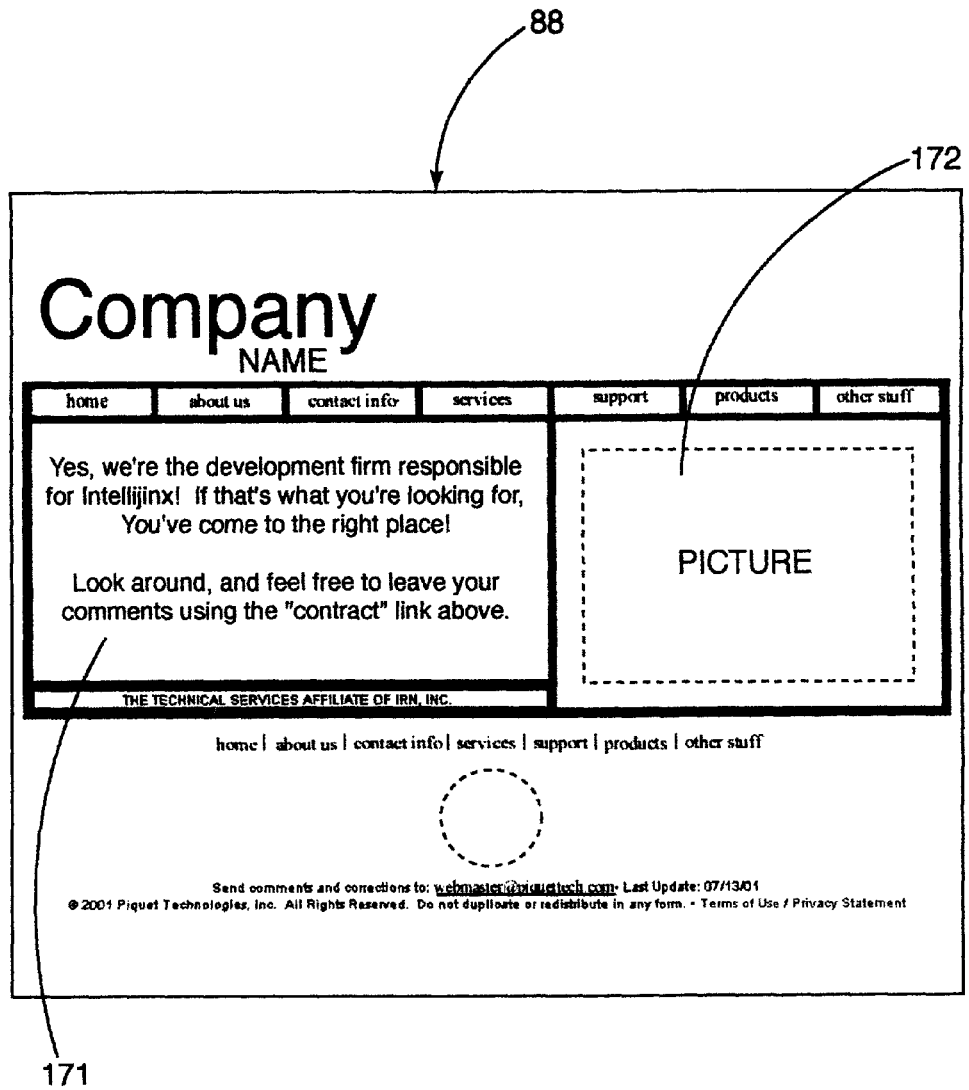
FIG. 16 is a changed web page.

In the preferred embodiment, all changes are first performed to a test area such as a BETA web site. The BETA web site allows the requestor to first view any changes. In larger corporations, this may be advantageous by allowing different personnel to each view and okay the change before it is published on the actual web site. It should be apparent that a preview feature is also helpful in other applications to ensure that the changed program still executes and functions properly. Of course, in some applications the user may desire the changes to be made directly to the actual program or web site. In the web page example, upon clicking the link 115 in the confirmation reply 114, the user is directed to the BETA web site 170 as shown in FIG. 14. In comparing FIG. 3 with FIG. 15, it may be easily seen that the text 171 and the image 172 have been changed. In the preferred embodiment, the BETA page 170 includes a link 173 that approves the changes and transfers them to the actual web site. The software may be set up so that after the requestor approves the change, an administrator still must provide final approval before any changes are transferred to the actual web site. For security reasons, the requester may be required to enter a user ID, password or some other means of security identification before the final changes are approved to prevent unauthorized approvals. As shown in FIG. 15, once a change is made, a final confirmation 180 is sent to the requester, the administrator, or both. In the preferred embodiment, this final confirmation 180 includes how many changes have been made 181, the specific web page of the changes 182, and a link to undo the change 183. The undo link 183 is a convenient method for mistakes to be undone. The publishing on the actual web site also may be delayed until an administrator approves the changes. In many cases, a site administrator will only be notified of any confirmed changes. An example of a published web page 88 incorporating all the changes may be seen in FIG. 16.

Figure 17:
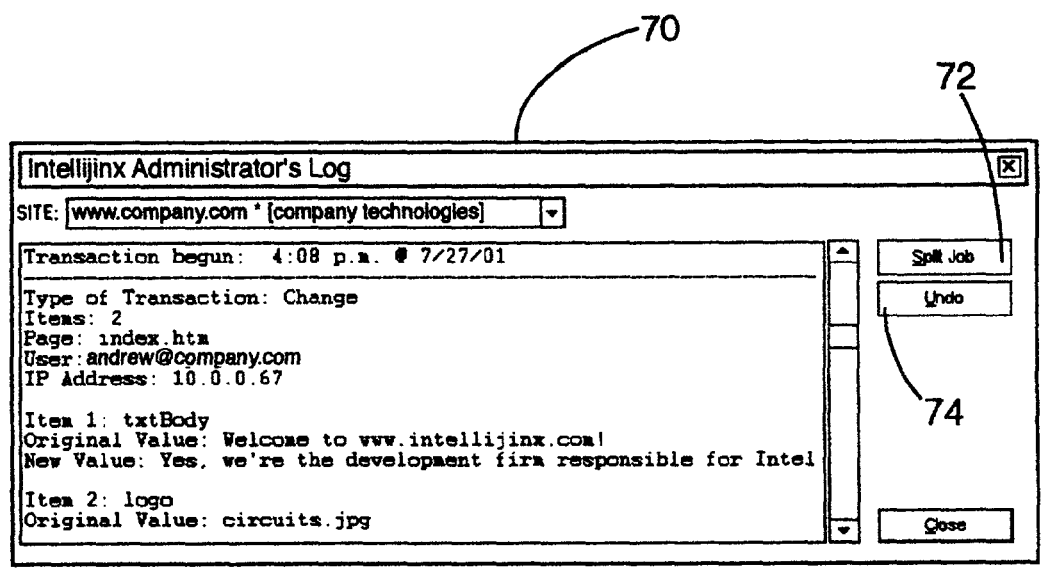
FIG. 17 is a log file entry.
Figure 18:
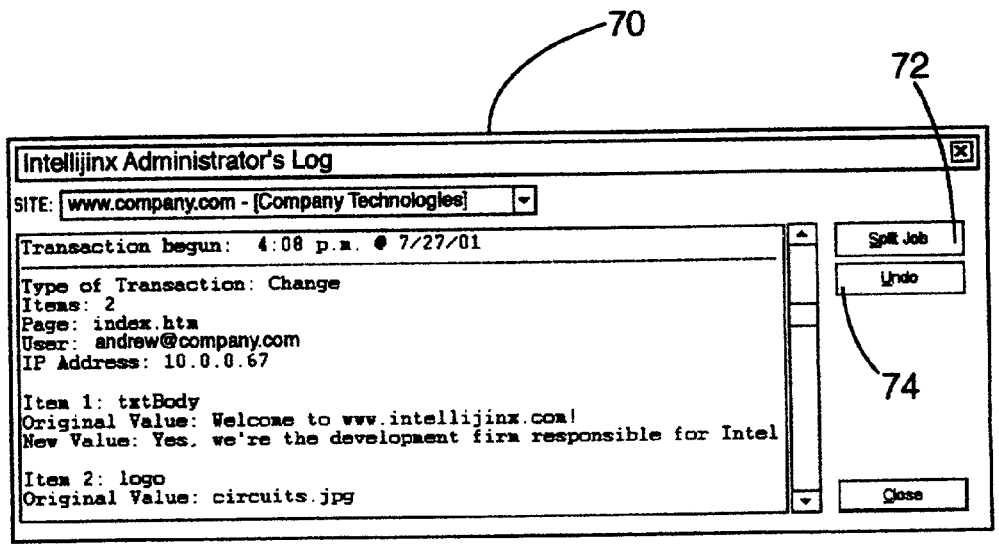
FIG. 18 is a log file with ability to undo changes.

An optional step of creating a log 116 may be implemented to track all changes to the web site or program. The log file (not shown) may include as much information as needed. A sample log entry 190 may be seen in FIG. 17. In the preferred embodiment, the log file will include the time of the request 191, the time of completion 192, who requested the change 193, the location of the change 194, the changes made 195 and who approved the change 196. Of course, the amount of information specified in the log file is specified when the software is implemented. An administrator's log file 70 may also be set up as in FIG. 18 to allow the requestor or administrator to review and undo any changes. The sample administrator's log file 70 includes a "Split Job" button 72 to separate multiple changes embedded in one request and an "Undo" button 74 to undo any changes. Depending on the selection criteria, changes may be undone by the user, date, week, department or any other method. Of course various other buttons may be added to perform additional tasks as desired.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The invention claimed is:

1. A method of operating a software program in order to change a web site, the web site having a plurality of web pages stored on a server, comprising the steps of:
   receiving an email;
   parsing the email to create a variable list;
   determining from the variable list a request type, the request type indicative of a type of modification to the web site, the type of modification being one of deleting a web page from the web site;
   determining from the variable list the first web page, the first web page being the target of the request type; and
   modifying the web site in accordance with the request type.

2. The method of claim 1 where and the email has a subject line further comprising:
   where the step of determining the first web page consists of parsing a subject line of the email.

3. The method of claim 2 further comprising:
   determining whether the sender of the email is authorized to change the web site.

4. The method of claim 3 further where the email has a sender address and the step of determining whether the sender of the email is authorized to change the web site comprises:
   comparing the sender address with a first database to determine a sender access level; and
   based upon the sender access level, determining if the sender is authorized to change the first web page.

5. The method of claim 4 further comprising:
   obtaining a sender IP address; and
   comparing the sender IP address to a range of IP addresses.

6. The method of claim 5 further comprising:
   sending a confirmation email to a web site administrator.

7. The method of claim 6 further comprising:
   if the sender IP address was not within the range of IP addresses, then:
   creating an error notification; and
   sending the error notification to the sender address.

8. A computer readable medium for modifying a web site, the web site having web pages stored on a server, the computer readable medium having program code recorded thereon for execution in a computer comprising:
   a first program code unit for receiving an email from a sender;
   a second program code unit for parsing the email into a variable list;
   a third program code unit for determining from the variable list a request type, the request type being one of deleting a first web page from the web site; and
   a fourth program code unit for modifying the web site in accordance with the request type.

9. The computer readable medium of claim 8 further comprising:
   a fifth program code unit for determining from the variable list a web page variable, the web page variable identifying the first web page.

10. The computer readable medium of claim 9 further comprising:
    a sixth program code unit for determining from the variable list a count of changes to the web site.

11. The computer readable medium of claim 10 further comprising:
    a seventh program code unit for determining a first portion of the first web page to be changed; and
    an eighth program code unit for applying the first change item to the first portion.

12. The computer readable medium of claim 11 where the communication was initiated by a user further comprising:
    a ninth program code unit for determining a user identifier, comparing the user identifier with a security verification database and retrieving from the security verification database an access level for the user;
    and a tenth program code unit for applying the first change item to the first portion if the access level is acceptable.

13. The method of claim 16 further comprising:
    if the request type is for a change to web pages, creating a programming code segment from the variable list; and
    incorporating the programming code segment into the programming code for the first web page.

14. The method of claim 13 further comprising:
    if the request type is to delete the first web page, then deleting the first web page from the web site.

15. The method of claim 14 further comprising:
    if the request type is to add the additional web page, then creating the additional web page in the web site.

16. The method of claim 1 where the request type could also be one of adding an additional web page to the web site.

* * * * *